May 9, 1939.  W. R. PENROSE ET AL  2,157,303
DRAINING FRYING PAN
Filed April 24, 1936
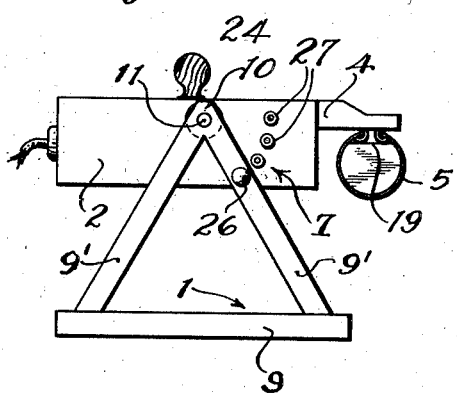
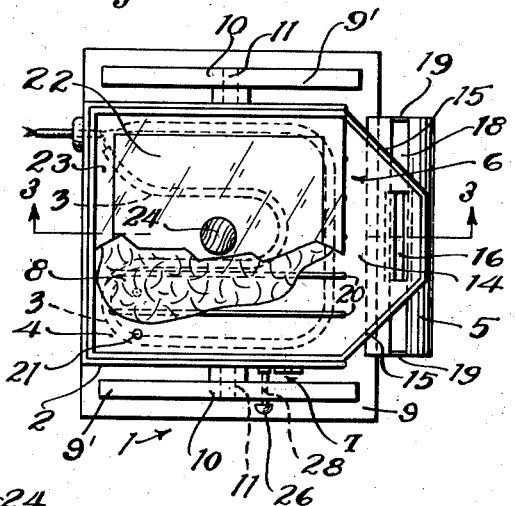
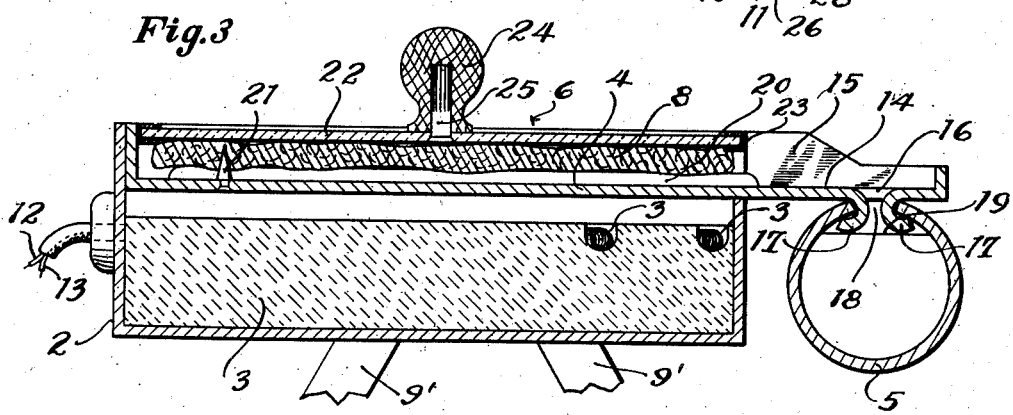
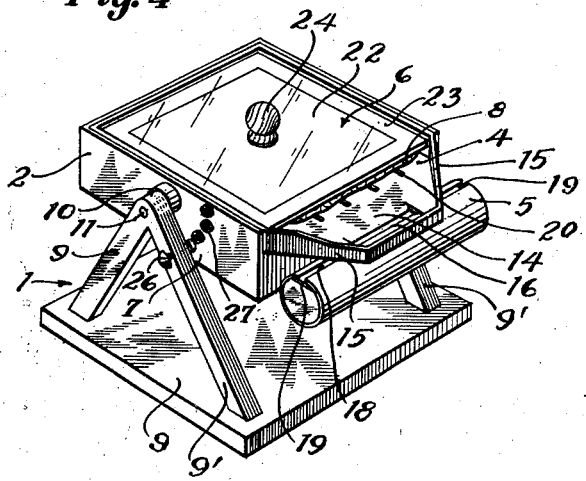
William Ralph Penrose
Irving Laird Penrose,
INVENTORS.
BY
ATTORNEY Patented May 9, 1939

2,157,303

UNITED STATES PATENT OFFICE 2,157,303

DRAINING FRYING PAN

William Ralph Penrose and Irving Laird Penrose, Pasadena, Calif.

Application April 24, 1936, Serial No. 76,215

3 Claims. (Cl. 53—5)

This invention relates to cooking apparatus, and more particularly to a cooker particularly useful for frying bacon.

The general object of the invention is to provide a cooker in which bacon may be fried more rapidly, without burning or curling, and with less shrinkage than otherwise.

A more particular object is to provide a cooker of the character stated by means of which the grease may be drained from the bacon, and the greaseless bacon subjected to a higher frying temperature than otherwise, whereby the bacon is not only cooked more rapidly and without burning, and with less shrinkage, but is cooked in such manner that it is more digestible.

A further object is to provide a cooker of the character stated in the preceding paragraph, including means for collecting the grease, drained from the bacon, in such manner that it will be more useful than otherwise for flavoring and shortening.

Other objects and advantages will appear hereinafter.

In the drawing:

Figure 1 is a side elevation of our cooker,

Figure 2 is a plan view of our cooker,

Figure 3 is a transverse vertical section of our cooker on an enlarged scale, taken on line 3—3 of Figure 2, and, Figure 4 is a perspective of our cooker.

Referring more particularly to the drawing, in which corresponding parts are designated by the same reference characters in all of the figures, our cooker comprises generally a stand 1, a cradle 2 pivotally mounted on said stand, an electrical heating unit 3 mounted in the lower part of said cradle, a frying pan 4 mounted in the upper part of said cradle a short distance above said heating unit, a grease receptacle 5 into which the grease may be drained from said frying pan when said cradle is swung on its pivot, a lid 6 for said frying pan, and locking means 7 for locking said cradle tipped at different angles for draining the grease from said frying pan into said receptacle 5 during the progress of frying the bacon 8 in said frying pan.

The stand 1 comprises a base 9 and a pair of spaced standards 9' upstanding from said base and formed with bearings 10 in their upper ends in which are journaled trunnions 11 outstanding from the ends of the cradle 2 whereby said cradle is pivotally mounted upon and between said standards 9'.

From the heating unit 3 lead wires 12 and 13 extend through one side of the cradle 2 and may be connected to a plug (not shown) to be inserted into a wall socket for supplying electric current to said heating unit.

The frying pan 4 is formed at one side with a drain trough 14, the side walls 15 of which converge outwardly toward the ends of an outlet in the form of a slot 16 extending coaxially of the cradle 2, in the bottom of said trough near its outer end, for directing the grease from the frying pan through said trough and out through said outlet into the receptacle 5 below, when the cradle is tipped downwardly toward said receptacle, which receptacle is detachably mounted on the under side of said trough 14 by means of a pair of beads 17 depending from said trough at opposite sides of said outlet 16 through a slot 18 in the upper side of said receptacle 5 and engaging the inner side of the wall of said receptacle at opposite sides of said receptacle slot, the edges of the receptacle wall at opposite sides of said receptacle slot slidably fitting in the outer sides of said beads 17, and the end walls of said receptacle being cut away from the ends of the receptacle slot 18, at 19, to permit the beads 17 to slide through the ends of said receptacle slot, in fitting the receptacle on said beads or removing the receptacle therefrom. On the bottom wall of the frying pan 4 is formed a plurality of spaced upstanding ribs 20 extending transversely of the pan to the trough 14, upon which ribs the bacon 8 rests in the pan. Prongs 21 are secured in the bottom of the frying pan 4 and extend upwardly to project into the bacon and hold the bacon in frying position in the pan.

Preferably the lid 6 comprises a glass plate 22 with its edges fitted in a metal frame 23 through which glass plate the bacon may be seen when the lid is placed in the frying pan upon the bacon. The metal frame 23 protects the edges of the glass plate against chipping. A handle 24 is secured to the upper side of the glass plate 22 in the center thereof by means of a stud 25 extending upwardly through said plate into said handle, by means of which handle the lid 6 may be lowered into the frying pan upon the upper side of the bacon or lifted out of the frying pan.

The locking means 7 comprises a pin 26 and a plurality of spaced sockets 27 in one end of the cradle 2, said pin being slidably fitted in an opening 28 in the adjacent standard 9' for engaging said sockets respectively, for locking said cradle in a horizontal position or tipped at different angles so that the grease may drain from the frying pan through the trough 14 and the outlet 16 into the receptacle 5.

The operation, uses and advantages of our invention are as follows:

The cradle 2 is first locked in a level or horizontal position by introducing the pin 26 into the lowermost socket 27, as illustrated in Figures 1, 2 and 4 of the drawing. The bacon 8 is placed in the frying pan upon the ribs 20 and the prong 21 projected through the bacon for holding it from sliding in the frying pan when the cradle and frying pan are swung out of horizontal position. The lid 6 is then placed in the frying pan upon the bacon. The pin 26 is then withdrawn from the lowermost socket 27 and the cradle 2 swung on its trunnions 11 to the desired angle for draining the grease from the frying pan through the trough 14 and outlet 16 into the receptacle 5. The pin 26 is then introduced into one of the other sockets 27 for locking the cradle and frying pan at said desired angle.

A controlling switch (not shown) is then turned on for supplying a strong electric current through the heating element 3, and the heat generated by said heating element will melt the grease which will drain out of the frying pan 4 through the trough 14 and its outlet 16 into the receptacle 5, and cook the bacon rapidly and thoroughly, whereupon the lid 6 is lifted by its handle 24 from the bacon and out of the frying pan, and the bacon is then removed from the frying pan by a fork or otherwise.

Since the meaty portion of bacon will stand a higher temperature than the grease, our cooker, by draining the grease from the bacon, permits a higher temperature for frying bacon than can be used when the bacon grease remains in the pan (as is the case where the surface of the pan is permanently horizontal), thereby reducing the time required for frying. Because the bacon grease will burn at a lower temperature than the meaty portion of the bacon, draining of the grease from the bacon reduces the danger of burning the bacon.

Bacon fried rapidly by our cooker at a higher temperature than otherwise with the grease drained from the bacon, makes the bacon more digestible.

Another advantage of rapid drying is that the longer the bacon is fried, the greater the shrinkage. With our cooker, the time required for frying is reduced and shrinkage is reduced in proportion.

Furthermore, the draining off of the bacon grease into a detachable reservoir 5 makes the grease more useful for flavoring and shortening because the grease leaves the hot pan and drops into an unheated container before it has lost its natural flavor due to burning.

Draining of the grease from the bacon and pressure of the weight of the lid 6 upon the bacon and flattening of the bacon in the frying pan, prevents or materially reduces curling of the bacon.

The lid 6 may be placed upon the frying pan before the bacon is placed therein, and heated until hot, so that upon removal of the hot lid from the frying pan and placing the bacon therein, the hot lid may be placed upon the bacon to fry the bacon from the top, while it is being fried from underneath by the heat of the frying pan.

Our heating system is preferably electric because it is more practical. A frying pan tilted over the ordinary gas jet would overheat the portion of the pan nearest the flame while the part of the pan farthest away would not be heated sufficiently. Since special jets would have to be constructed, also special connections, all of which would make the device heavier and less portable, electricity including its various attachments for regulating and controlling the temperature, will be used for heating, except where it is necessary to use other means for heating.

We claim:

1. A cooker as disclosed including a frying pan, means for mounting said frying pan to be swung into a horizontal position, or into an inclined position for draining the grease from the frying pan, means for heating said frying pan while in a horizontal position or in an inclined position for frying meat in said frying pan, and impaling means for holding the meat in frying position in the frying pan while the frying pan is in an inclined position.

2. A cooker as disclosed including a frying pan, means for mounting said frying pan to be swung into a horizontal position or into an inclined position, a trough leading from one side of said frying pan through which trough the grease drains from the frying pan when in an inclined position, a receptacle detachably mounted on said trough to receive the grease from said trough which is drained from said frying pan when in an inclined position, and means for heating said frying pan when in a horizontal position or in an inclined position for frying meat in said frying pan.

3. A cooker for frying meat including standards, a cradle pivotally mounted in said standards, a frying pan mounted in said cradle, said frying pan being provided with a grease drain outlet at one side thereof, means in said cradle for heating said frying pan to fry meat therein, said cradle being constructed with a plurality of sockets at one side thereof, and a pin slidably mounted in one of said standards for engaging any one of said sockets for holding said cradle and said frying pan in a horizontal position or in positions of different inclinations, for frying meat in said frying pan and for draining grease from said frying pan while in an inclined position.

WILLIAM RALPH PENROSE.
IRVING LAIRD PENROSE.